United States Patent [19]
Hozumi

[11] Patent Number: 6,092,211
[45] Date of Patent: Jul. 18, 2000

[54] INTEGRATED CIRCUIT FOR SUPPLYING A CLOCK SIGNAL AND METHOD FOR CONSTRUCTING THE SAME

[75] Inventor: Masatoshi Hozumi, Tokyo, Japan

[73] Assignee: NEC Corporation, Tokyo, Japan

[21] Appl. No.: 09/134,576

[22] Filed: Aug. 14, 1998

[30] Foreign Application Priority Data

Aug. 14, 1997 [JP] Japan ................................. 9-219467

[51] Int. Cl.⁷ .......................................................... G06F 1/04
[52] U.S. Cl. ............................................................. 713/500
[58] Field of Search .................................. 713/500, 503; 395/500.02, 500.03; 326/93, 101

[56] References Cited

U.S. PATENT DOCUMENTS

| | | | |
|---|---|---|---|
| 5,570,045 | 10/1996 | Erdal et al. ................................ | 326/93 |
| 5,744,991 | 4/1998 | Jefferson et al. ........................ | 327/158 |
| 5,866,924 | 2/1999 | Zhu .......................................... | 257/208 |
| 5,912,820 | 6/1999 | Kerzman et al. ........................ | 716/6 |
| 5,974,245 | 10/1999 | Li et al. .............................. | 395/500.11 |

FOREIGN PATENT DOCUMENTS

0 308 267   3/1989   European Pat. Off. .

*Primary Examiner*—Thomas M. Heckler
*Attorney, Agent, or Firm*—Sughrue, Mion, Zinn, Macpeak & Seas. PLLC

[57] ABSTRACT

A clock signal supplying integrated circuit includes a clock tree constituted of only 3.3V-operating buffers connected in the form of a tree having three cascaded stages. A first stage buffer of the clock tree is connected to a clock input terminal, and a plurality of third stage buffers are connected to a clock input of 3.3V-operating flipflops and a clock input of 2.5V-operating flipflops. Thus, the clock propagation time from the clock input terminal to the clock input of 2.5V-operating flipflops is made equal to the clock propagation time from the clock input terminal to the clock input of 3.3V-operating flipflops, so that the in-phase clocks signals are distributed to the 3.3V-operating flipflops and the 2.5V-operating flipflops, regardless of variation of the diffusion condition of the LSI manufacturing process and/or the operating temperature of the LSI, and with using no delay circuit which was required in the prior art for compensating for the difference in the propagation time between the clock signal applied to 2.5V-operating flipflops and the clock signal applied to 3.3V-operating flipflops.

12 Claims, 6 Drawing Sheets

Fig. 6 PRIOR ART

INTEGRATED CIRCUIT FOR SUPPLYING A CLOCK SIGNAL AND METHOD FOR CONSTRUCTING THE SAME

BACKGROUND OF THE INVENTION

1. Field of the Invention

The present invention relates to an integrated circuit for supplying a clock signal and a method for constructing the same, and more specifically to a clock signal supplying integrated circuit, called a "clock tree", internally provided in an LSI having a plurality of power supply voltages, for supplying a clock signal to a circuit for transferring data between memory means driven with different power supply voltages, respectively.

2. Description of Related Art

In an LSI (large-scaled integrated circuit), it is in many cases that a circuit is designed to be constituted of synchronous circuits operating in synchronism with a clock signal. The synchronous circuits have an advantage that a logic can be easily synthesized. On the other hand, if there occurs a phase deviation between clock signals supplied to memory means, respectively, a data transfer cannot be often normally achieved between the memory means.

As a clock signal supplying circuit for making clock signals in phase to each other, a clock signal supplying circuit called a "clock tree" has been known. This clock tree is a clock driver circuit composed of a plurality of buffers connected in the form of a tree, for supplying in-phase clock signals to for example a plurality of memory means, respectively.

Here, assuming that the memory means is constituted of a flipflop, for example, the clock tree is constituted in such a manner that an output of a first stage buffer is connected to an input of each of a plurality of second stage buffers, and an output of each of the second stage buffers is connected to a clock input of each of the same number of flipflops. In the buffers thus connected in the form of the tree, if a clock signal is supplied to an input of the first stage buffer, the clock input of the flipflops connected at a terminating end of the clock tree are supplied with the clock signals in phase to one another.

This clock tree has an advantage that even if the number of flipflops and/or the chip area of the LSI is changed in the course of a designing, it is possible to supply the in-phase clock signals to the flipflops located at the terminating end of the clock tree, by changing a gate length and/or a gate width of transistors included in the buffers, and/or by changing the number of cascaded buffer stages.

However, with an advanced semiconductor manufacturing process, an LSI having a high integration density could has been developed, with the result that the number of transistors internally provided in the LSI is increased, and therefore, the consumed electric power is correspondingly increased. Under this circumstance, there has been adopted an approach of lowering a power supply voltage for some proportion of function blocks internally provided in the LSI, for the purpose of reduce the consumed electric power.

In this case, a plurality of power supply voltages are used in the LSI, and the LSI has been so designed that the circuit location areas are grouped in accordance with the power supply voltages. The clock tree for function blocks driven with a power supply voltage different from that for the other function blocks is prepared independently of the clock tree for the other function blocks, so that the first mentioned function blocks are operated with the different power supply voltage.

Figure 5:
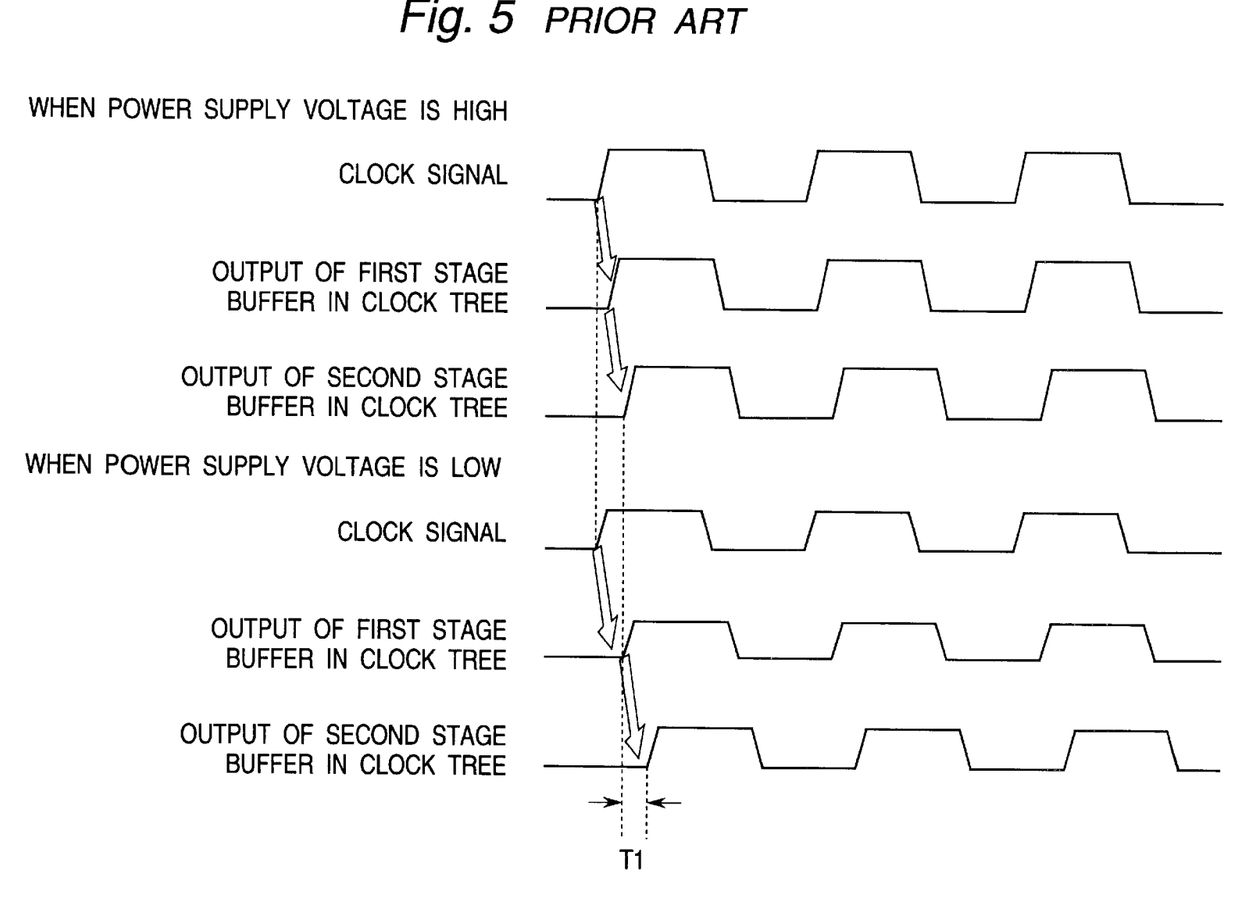
FIG. 5 a timing chart for illustrating the variation of the delay time when the clock tree composed of two cascaded buffer stages is driven with different power supply voltages.

In general, a delay time from the moment an input signal of a gate circuit changes to the moment an output signal of the same gate actually changes, varies if the power supply voltage for the same gate is changed. Therefore, in the buffer circuit used in the clock tree, if the power supply voltage changes, the delay time also changes. This situation is illustrated in FIG. 5, which is a timing chart for illustrating the variation of the delay time when the clock tree having two cascaded buffer stages is driven with different power supply voltages.

As shown in the timing chart of FIG. 5, when the same clock signal is supplied to the clock tree driven with a high power supply voltage and to the clock tree driven with a low power supply voltage, the clock signal outputted from the second stage buffer of the clock tree driven with the low power supply voltage is later than the clock signal outputted from the second stage buffer of the clock tree driven with the high power supply voltage, by a time T1. For example, when a circuit shown in FIG. 3 which will be described hereinafter is manufactured in a 0.35 micron process, the time difference T1 between a 3.3V power supply voltage driving and a 2.5V power supply voltage driving becomes 0.6 ns.

In a synchronous circuit for transferring data between a function block driven with a low power supply voltage and the other function block, it is necessary to supply the clock signals having the same frequency and the same phase to not only the flipflops driven with the standard power supply voltage but also the flipflops driven with the low power supply voltage. For this purpose, a delay circuit is used for compensating for the time difference T1, so that the clock signals supplied to all the flipflops are maintained in phase to one another, and therefore, the data can be normally transferred between the function blocks driven with different power supply voltages.

The reason for compensating for the time difference by use of the delay circuit is that: If it is attempted to compensate for the time difference by changing the gate length and/or the gate width of transistors in the buffers of the clock tree, it becomes necessary to change the area of the buffer circuit, with the result that there is possibility that the modified buffer circuits can be no longer located.

Figure 3:
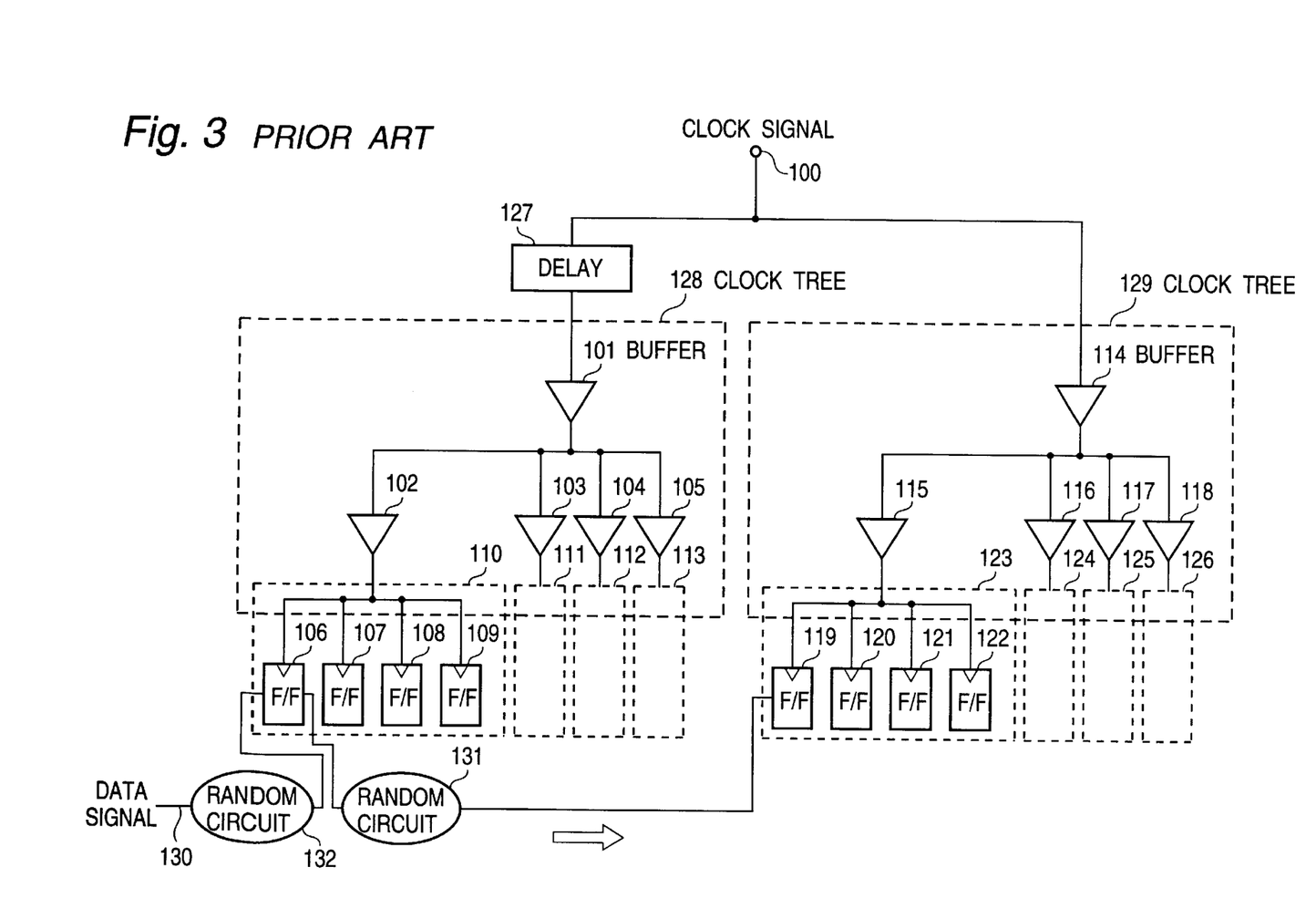
FIG. 3 is a block diagram of one example of the prior art clock signal supplying integrated circuit for supplying clock signals to function blocks driven with different power supply voltages.

Referring to FIG. 3, there is shown a block diagram of one example of the prior art clock signal supplying integrated circuit for supplying in-phase clock signals to function blocks driven with different power supply voltages. The shown prior art example has two kinds of power supplies including a 3.3V power supply and a 2.5V power supply.

In FIG. 3. a clock input terminal 100 is supplied with a clock signal which is either supplied through an external terminal of the LSI or generated in a clock generator internally provided in the LSI. This clock input terminal 100 is connected directly to a clock tree 129, and also, through a delay circuit 127 driven with a 3.3V power supply voltage, to another clock tree 128.

The clock tree 128 is a clock tree for a circuit block driven with the 3.3V power supply voltage, and the clock tree 129 is a clock tree for the circuit block driven with a 2.5V power supply voltage. Flipflop groups 110 to 113, which are circuit blocks driven with the 3.3V power supply voltage, are connected to the clock tree 128, and flipflop groups 123 to 126, which are circuit blocks driven with the 2.5V power supply voltage, are connected to the clock tree 129.

Next, the construction of the clock trees 128 and 129 will be described in detail. The clock tree 128 is composed of 3.3V-operating buffers 101, 102, 103, 104 and 105 (driven with the 3.3V power supply voltage) connected in a tree structure having two cascaded buffer stages. Therefore, the clock tree 128 is constituted of only the circuits operating with the 3.3V power supply voltage. An input of the buffer 101 is connected to an output of the delay circuit 127, and an input of each of the buffers 102 to 105 is connected to an output of the buffer 101. 3.3V-operating flipflops connected to outputs of the 3.3V-operating buffers 102 to 105 are divided into the 3.3V-operating flipflop groups 110 to 113 in such a manner that the same number of flipflops are connected to the output of each buffer.

The 3.3V-operating flipflop group 110 includes 3.3V-operating flipflops 106 to 109, a clock input of each of which is connected to the output of the 3.3V-operating buffer 102. Similarly, a clock input of a plurality of flipflops included in the flipflop groups 111 to 113 are connected to an output of the 3.3V-operating buffers 103 to 105, respectively.

The clock tree 129 is composed of 2.5V-operating buffers 114, 115, 116, 117 and 118 (driven with the 2.5V power supply voltage) connected in a tree structure having two cascaded buffer stages.

Therefore, the clock tree 129 is constituted of only the circuits operating with the 2.5V power supply voltage. An input of the buffer 114 is connected to the clock input terminal 100, and an input of each of the buffers 115 to 118 is connected to an output of the buffer 114. 2.5V-operating flipflops connected to outputs of the 2.5V-operating buffers 115 to 118 are divided into the 2.5V-operating flipflop groups 123 to 126 in such a manner that the same number of flipflops are connected to the output of each buffer.

The 2.5V-operating flipflop group 123 includes 2.5V-operating flipflops 119 to 122, a clock input of each of which is connected to the output of the 2.5V-operating buffer 115. Similarly, a clock input of a plurality of flipflops included in the flipflop groups 124 to 126 are connected to an output of the 2.5V-operating buffers 116 to 118, respectively.

Figure 4:
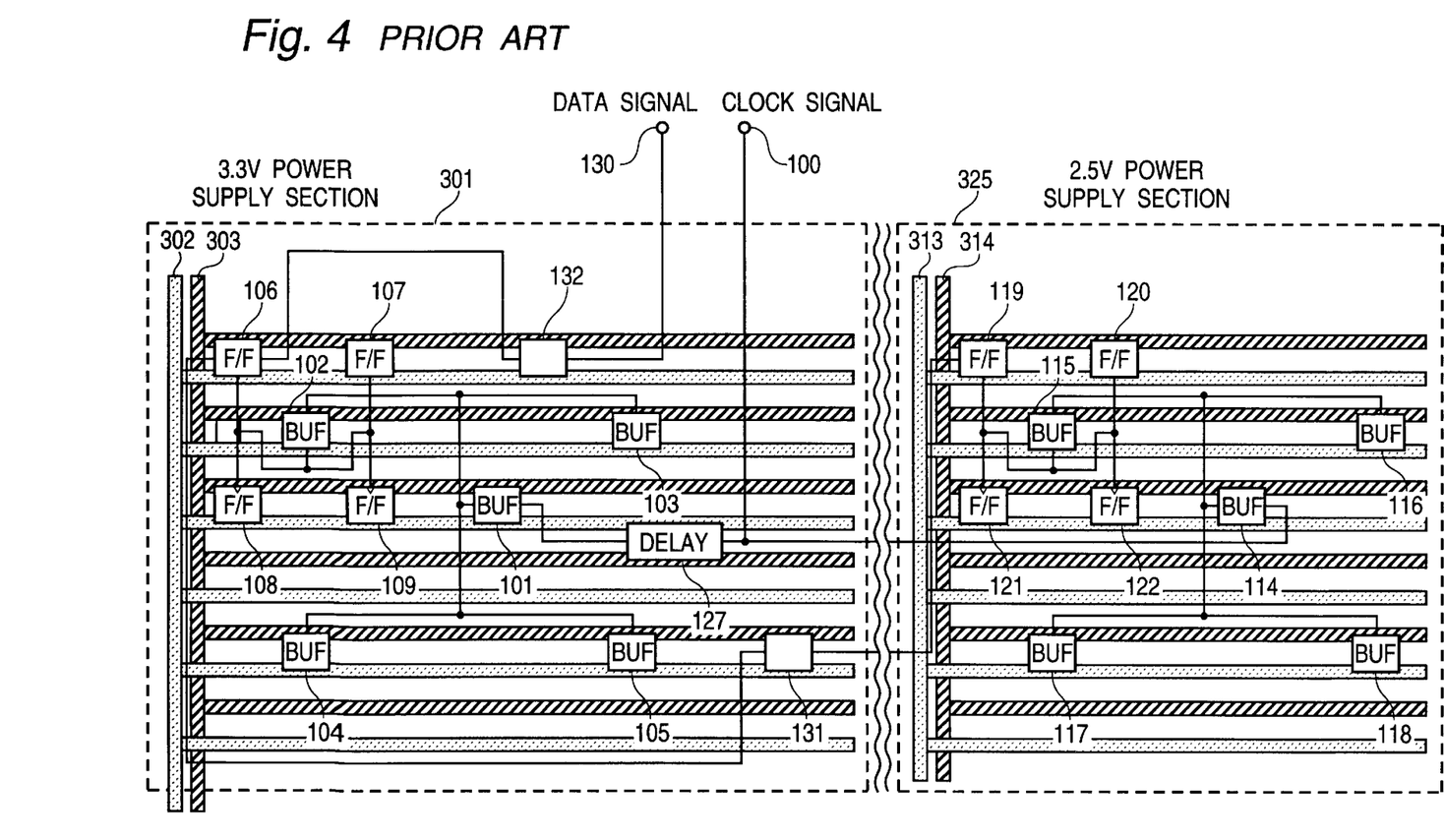
FIG. 4 is a layout diagram of one example of the layout of the prior art clock signal supplying integrated circuit shown in FIG. 3.

Referring to FIG. 4, there is shown a layout diagram of one example of the layout of the prior art clock signal supplying integrated circuit shown in FIG. 3.

In FIG. 4, in a 3.3V power supply voltage section 301 there are located a ground interconnection 302, a 3.3V power supply voltage interconnection 303, the buffers 101 to 105 of the clock tree 128, the 3.3V-operating flipflops 106 to 109, random circuits 131 and 132 each located between flipflops, and the 3.3V-operating delay circuit 127. On the other hand, in a 2.5V power supply voltage section 325, there are located a ground interconnection 313, a 2.5V power supply voltage interconnection 314, the buffers 114 to 118 of the clock tree 129, the 2.5V-operating flipflops 119 to 122.

In FIG. 4, the 3.3V-operating buffers 101 to 105, the 2.5V-operating buffers 114 to 118, the 3.3V-operating flipflops 106 to 109, the 2.5V-operating flipflops 119 to 122, the 3.3V-operating delay circuit 127 and the random circuits 131 and 132 are layout cells.

Here, the layout cell is a graphical piece indicative of layout information of circuit elements such as a flipflop, a buffer, etc. The layout cell has a ground terminal and a power supply terminal located at opposite ends, respectively. When the layout cell is located, the power supply terminal of the layout cell is connected to the power supply voltage interconnection and the ground terminal of the layout cell is connected to the ground interconnection, by rotating the layout cell by 90 degrees if necessary.

Next, the ground interconnections 302 and 313, the 3.3V power supply voltage interconnection 303 and the 2.5V power supply voltage interconnection 314 will be described in detail.

The ground interconnection 302 are laid out in a periphery of the 3.3V power supply voltage section 301 and to extend in a plurality of horizontal directions, and the 3.3V power supply voltage interconnection 303 are also laid out in a periphery of the 3.3V power supply voltage section 301 and to extend in a plurality of horizontal directions, in such a manner that the ground interconnection 302 and the 3.3V power supply voltage interconnection 303 are paired but separated from each other by a constant spacing.

Similarly, the ground interconnection 313 are laid out in a periphery of the 2.5V power supply voltage section 325 and to extend in a plurality of horizontal directions, and the 2.5V power supply voltage interconnection 314 are also laid out in a periphery of the 2.5V power supply voltage section 325 and to extend in a plurality of horizontal directions, in such a manner that the ground interconnection 313 and the 2.5V power supply voltage interconnection 314 and paired but separated from each other by a constant spacing.

Next, the clock tree and the flipflops in the 3.3V power supply voltage section 301 will be described. Each of the 3.3V-operating flipflops 106 to 109 is located between the ground interconnection 302 and the 3.3V power supply voltage interconnection 303. Each of the 3.3V-operating buffers 101 to 105 is also located between the ground interconnection 302 and the 3.3V power supply voltage interconnection 303. The clock input of each of the 3.3V-operating flipflops 106 to 109 is connected to the output of the 3.3V-operating buffer 102. The input of each of the 3.3V-operating buffers 102 to 105 is connected to the output of the 3.3V-operating buffer 101. Furthermore, although not shown in FIG. 4, the output of the 3.3V-operating buffers 103 to 105 are connected to respective clock inputs of the flipflops in the 3.3V-operating flipflop groups 111 to 113.

Furthermore, the clock tree and the flipflops in the 2.5V power supply voltage section 325 will be described. Each of the 2.5V-operating flipflops 119 to 122 is located between the ground interconnection 313 and the 2.5V power supply voltage interconnection 314. Each of the 2.5V-operating buffers 114 to 118 is also located between the ground interconnection 313 and the 2.5V power supply voltage interconnection 314. The clock input of each of the 2.5V-operating flipflops 119 to 122 is connected to the output of the 2.5V-operating buffer 115. The input of each of the 2.5V-operating buffers 115 to 118 is connected to the output of the 2.5V-operating buffer 114. Furthermore, although not shown in FIG. 4, the output of the 2.5V-operating buffers 116 to 118 are connected to respective clock inputs of the flipflops in the 2.5V-operating flipflop groups 124 to 126.

In addition, a construction between the clock input terminal 100 and the clock trees 128 and 129 will be described in detail. The 3.3V-operating delay circuit 127 is located between the ground interconnection 302 and the 3.3V power supply voltage interconnection 303. The input of the 3.3V-operating buffer 101 is connected to the output of the delay circuit 127. The clock input terminal 100 is connected to the input of the 2.5V-operating buffer 114 and the input of the 3.3V-operating delay circuit 127.

Furthermore, each of the random circuits 131 and 132 is located between the ground interconnection 302 and the 3.3V power supply voltage interconnection 303. A data input of the random circuit 132 is connected to a data input terminal 130, and a data output of the random circuit 132 is connected to a data input of the 3.3V-operating flipflop 106. A data output of the 3.3V-operating flipflop 106 is connected to an input of the random circuit 131, which in turn has an output connected to a data input terminal of the 2.5V-operating flipflop 119.

In the circuit shown in FIG. 3, the transfer time of the clock signal from the clock input terminal 100 to the 2.5V-operating flipflop 119 is the total time of an interconnection delay time from the clock input terminal 100 to the input of the 2.5V-operating buffer 114, a gate delay time of the 2.5V-operating buffer 114, an interconnection delay time from the 2.5V-operating buffer 114 to the input of the 2.5V-operating buffer 115, a gate delay time of the 2.5V-operating buffer 115, and an interconnection delay time from the 2.5V-operating buffer 115 to the clock input of the 2.5V-operating flipflops 119 to 122.

Therefore, in order to supply the clock signal, at the same timing, to the clock input of all the flipflops connected to the clock tree 129, it is so constructed that the above mentioned total time assumes the same value at the clock input of the respective flipflops. For this purpose, specifically, the interconnection delay times from the first stage 2.5V-operating buffer 114 to the input of the respective second stage 2.5V-operating buffers 115 to 118 are made equal, the gate delay times of the 2.5V-operating buffers 115 to 118 are also made equal, and further, the interconnection delay times from each of the 2.5V-operating buffers 115 to 118 to the clock input of the respective 2.5V-operating flipflops (119 to 122 and not-shown others) included in the flipflop groups 123 to 126 are made equal.

The gate delay time is determined by the gate length and the gate width of transistors, and the interconnection delay time is determined by the gate length and the gate width of transistors and a wiring capacitance parasitic on the output of the transistor. Therefore, the gate length and the gate width of transistors in the buffers at the same stage level in the cascaded connection structure are made equal, and the wiring capacitance of the interconnections at the same stage level in the cascaded connection structure are made equal. As a result, respective clock signals supplied to the clock input of all the flipflops connected to the clock tree 129, are made to have the same timing, namely, the same phase. This is also true in the clock tree 128.

In the above mentioned manner, the delay times form the input of each of the clock trees 128 and 129 to the clock input of all the flipflops located at the terminating end of the clock tree are made equal to one another, so that the clock signals supplied to the respective flipflops are made in phase to one another.

However, since the clock tree 128 and the clock tree 129 are different from each other in the buffer driving power supply voltage, the clock tree 128 and the clock tree 129 are also different from each other in the gate delay time and in the interconnection delay time. Therefore, the delay time is adjusted by inserting the 3.3V-operating delay circuit 127 between the clock input terminal 100 and the input of the clock tree 128. Thus, the clock signals having the same phase (namely, the same timing) are supplied to the flipflops connected to the clock tree 128 and the flipflops connected to the clock tree 129, respectively.

With the above mentioned arrangement, the data transfer between the blocks driven with different power supply voltages, respectively, exemplified by the data transfer from the 3.3V-operating flipflop 106 through the random circuit 131 to the 2.5V-operating flipflop 119, can be normally realized.

Now, a method for constructing the above mentioned prior art clock signal supplying integrated circuit will be described with reference to FIG. 4.

First, the section 301 for locating 3.3V layout cells therein and the section 325 for locating 2.5V layout cells therein are determined. Then, the ground interconnection 302 and the 3.3V power supply voltage interconnection 303 are laid out in the 3.3V power supply section 301, as shown in FIG. 4, and the ground interconnection 313 and the 2.5V power supply voltage interconnection 314 are laid out in the 2.5V power supply section 325, as shown in FIG. 4. Furthermore, the 3.3V layout cells other than the clock tree are located between the ground interconnection 302 and the 3.3V power supply voltage interconnection 303 in the 3.3 V power supply section 301, and the 2.5V layout cells other than the clock tree are located between the ground interconnection 313 and the 2.5 V power supply voltage interconnection 314 in the 2.5V power supply section 325.

Thereafter, the clock tree in the 3.3V power supply section 301 is laid out and connected. Here, since the flipflops connected to the 3.3V-operating buffers 101 to 105 have the same construction, the 3.3V-operating buffer 102 will be described as a representative in the following:

First, the 3.3V-operating buffer 102 is located between the ground interconnection 302 and the 3.3V power supply voltage interconnection 303 at a center position among the 3.3V-operating flipflops 106 to 109. Then, the output of the 3.3V-operating buffer 102 is connected to the respective clock inputs of the 3.3V-operating flipflops 106 to 109, by using a detouring wiring if necessary, in such a manner that the wiring capacitances become equal to one another.

Thereafter, the 3.3V-operating buffer 101 is located between the ground interconnection 302 and the 3.3V power supply voltage interconnection 303 at a center position among the 3.3V-operating buffers 102 to 105. Then, the output of the 3.3V-operating buffer 101 is connected to the respective inputs of the 3.3V-operating buffers 102 to 105, by using a detouring wiring if necessary, in such a manner that the wiring capacitances become equal to one another.

The above is a method for laying out and connecting the clock tree in the 3.3V power supply section 301.

Then, the clock tree in the 2.5V power supply section 325 is laid out and connected. Here, since the flipflops connected to the 2.5V-operating buffers 115 to 118 have the same construction, the 2.5V-operating buffer 115 will be described as a representative in the following:

First, the 2.5V-operating buffer 115 is located between the ground interconnection 313 and the 2.5V power supply voltage interconnection 314 at a center position among the 2.5V-operating flipflops 119 to 122. Then, the output of the 2.5V-operating buffer 115 is connected to the respective clock inputs of the 2.5V-operating flipflops 119 to 122, by using a detouring wiring if necessary, in such a manner that the wiring capacitances become equal to one another.

Thereafter, the 2.5V-operating buffer 114 is located between the ground interconnection 313 and the 2.5V power supply voltage interconnection 314 at a center position among the 2.5V-operating buffers 115 to 118. Then, the output of the 2.5V-operating buffer 114 is connected to the respective inputs of the 2.5V-operating buffers 115 to 118, by using a detouring wiring if necessary, in such a manner that the wiring capacitances become equal to one another.

The above is a method for laying out and connecting the clock tree in the 2.5V power supply section 325.

Thereafter, a transfer time in the clock tree laid out and connected in the 3.3V power supply section 301 and a transfer time in the clock tree laid out and connected in the 2.5V power supply section 325 are measured. And, "n" times the gate delay time of the buffer, which can be most approximated to the difference between the two measured transfer times, is found out.

Then, the delay circuit 127 composed of "n" cascaded 3.3V-operating buffers is prepared. The 3.3V-operating delay circuit 127 thus prepared is located between the ground interconnection 302 and the 3.3V power supply voltage interconnection 303 in the 3.3V power supply section 301. The output of the 3.3V-operating delay circuit 127 is connected to the input of the 3.3V-operating buffer 101.

Finally, the clock input terminal 100 is connected to the input of the 2.5V-operating buffer 114 and the input of the 3.3V-operating delay circuit 127. At this time, it is so adjusted, if necessary, by using a detouring wiring, that the transfer time from the clock input terminal 100 to the input of the 3.3V-operating delay circuit 127 becomes equal to the transfer time from the clock input terminal 100 to the input of the input of the 2.5V-operating buffer 114.

Incidentally, for the interconnection, for example, a vertical interconnection is formed of a second level aluminum conductor, and a horizontal interconnection is formed of a first level aluminum conductor. In addition, in order to ensure that the power supply interconnection and the ground interconnection never become short-circuited to each other, the power supply interconnection and the ground interconnection are formed of aluminum conductors of different levels, respectively. Furthermore, the second level aluminum conductor and the first level aluminum conductor are interconnected through through-holes, so that the vertical interconnection is connected to the horizontal interconnection.

However, the following problems have been encountered in the above mentioned prior art clock signal supplying circuit.

As mentioned above, the delay circuit 127 is incorporated for compensating for the difference in the transfer time between the clock tree for the function block driven with the low power supply voltage and the clock tree for the other function block. However, depending upon the diffusion condition of the LSI manufacturing process, and when the operating temperature of the LSI varies, the gate delay time changes, and therefore, the delay time of the delay circuit 127 correspondingly changes, with the result that a phase deviation occurs between the clock signals supplied to the memory means of the function blocks driven with different power supply voltage changes. Because of this, in the synchronous circuit configured to transfer data between the function block driven with the low power supply voltage and the other function block, the normal data transfer becomes impossible if the diffusion condition of the LSI manufacturing process and/or the operating temperature of the LSI vary. In other words, it becomes difficult to design the synchronous circuit.

In the prior art, furthermore, when the layout is modified for changing the function and/or improving the characteristics, the locating positions of the layout cells and their interconnection route change, and further, the locating positions of the clock tree buffers and the memory means and their interconnection route also change correspondingly, with the result that it becomes necessary to measure the transfer time of the clock trees again, and to design the delay circuit anew. In other words, at each time the design is changed and/or the characteristics is improved, the delay circuit must be designed anew, and therefore, the time required for the designing become disadvantageously long.

SUMMARY OF THE INVENTION

Accordingly, it is an object of the present invention to provide a clock signal supplying integrated circuit and a method for constructing the same, which have overcome the above mentioned defects of the conventional one.

Another object of the present invention is to provide a clock signal supplying integrated circuit and a method for constructing the same, capable of supplying in-phase clock signals to memory circuits driven with different power supply voltages, even if the diffusion condition of the LSI manufacturing process and/or the operating temperature of the LSI vary, thereby to allow data to be normally transferred between blocks driven with different power supply voltages.

Still another object of the present invention is to provide a clock signal supplying integrated circuit and a method for constructing the same, capable of supplying in-phase clock signals to memory circuits driven with different power supply voltages, with using no delay circuit, even if the diffusion condition of the LSI manufacturing process and/or the operating temperature of the LSI vary.

A further object of the present invention is to provide a clock signal supplying integrated circuit and a method for constructing the same, capable of shortening the designing time.

The above and other objects of the present invention are achieved in accordance with the present invention by a clock signal supplying integrated circuit including a plurality of buffers connected in the form of a clock tree having at least two cascaded stages, for distributing clock signals to a plurality of memory means driven with different power supply voltages, wherein the plurality of buffers connected in the form of the clock tree are driven with the highest power supply voltage of the different power supply voltages, so that the clock signal is propagated in the clock tree with substantially the same delay time, an input clock signal being applied to a first stage buffer of the plurality of buffers connected in the form of the clock tree, and a plurality of output clock signals having substantially the same phase being supplied from final stage buffers of the plurality of buffers connected in the form of the clock tree to the plurality of memory means driven with the different power supply voltages, respectively.

With the above mentioned arrangement, since the clock signal is supplied to the plurality of memory means driven with different power supply voltages, through the intermediary of the plurality of buffers connected in the form of the clock tree having at least two cascaded stages and all driven with the common power supply voltage (which is the highest power supply voltage of the different power supply voltages, namely), even if the diffusion condition of the LSI manufacturing process and/or the operating temperature of the LSI vary, and therefore, even if the propagation time in the LSI, specifically, in the clock tree, also varies, there occurs no phase difference in the output clock signals actually applied to the plurality of memory means driven with different power supply voltages, respectively. The reason for this is that since all the plurality of buffers connected in the form of the clock tree having at least two cascaded stages are driven with the common power supply voltage, the gate delay times in the clock tree can be made equal to one another, and the wiring capacitances in the clock tree can be also made equal to one another. Furthermore, the delay circuit, which was required between the clock input terminal and the input of the clock tree in the prior art, is no longer necessary.

According to another aspect of the present invention, there is provided a method for constructing a clock signal supplying integrated circuit which includes a plurality of buffers connected in the form of a clock tree having at least two cascaded stages to distribute clock signals to a plurality of memory means driven with different power supply voltages, the method including the steps of laying out a ground interconnection and a plurality of power supply voltage interconnections for different power supply voltages in one location section, locating each of the memory means driven with the different power supply voltages, between the ground interconnection and the power supply voltage interconnection of a corresponding power supply voltage, locating each of a plurality of buffers between the ground interconnection and the power supply voltage interconnection for the highest power supply voltage of the power supply voltage interconnections and connecting the plurality of buffers to constitute a clock tree having at least two cascaded stages, connecting an input of a first stage buffer of the clock tree to a clock input terminal, and connecting an output of final stage buffers of the clock tree to a clock input of the plurality of memory means driven with the different power supply voltages.

According to the above mentioned method, when a power supply voltage A and a power supply voltage B are used, after the ground interconnection, an interconnection for the power supply voltage A and an interconnection for the power supply voltage B are laid out in the location section, the memory means driven with the power supply voltage A are located between the ground interconnection and the interconnection for the power supply voltage A, and the memory means driven with the power supply voltage B are located between the ground interconnection and the interconnection for the power supply voltage B. Each of buffers is located between the ground interconnection and the interconnection for the higher power supply voltage of the power supply voltages A and B, and the buffers are connected to constitute a clock tree having at least two cascaded stages. Accordingly, it becomes easy to locate the clock tree driven with one of a plurality of power supply voltages.

The above and other objects, features and advantages of the present invention will be apparent from the following description of preferred embodiments of the invention with reference to the accompanying drawings.

DESCRIPTION OF THE PREFERRED EMBODIMENTS

Now, an embodiment of the clock signal supplying integrated circuit in accordance with the present invention will be described with reference to the accompanying drawings.

Figure 1:
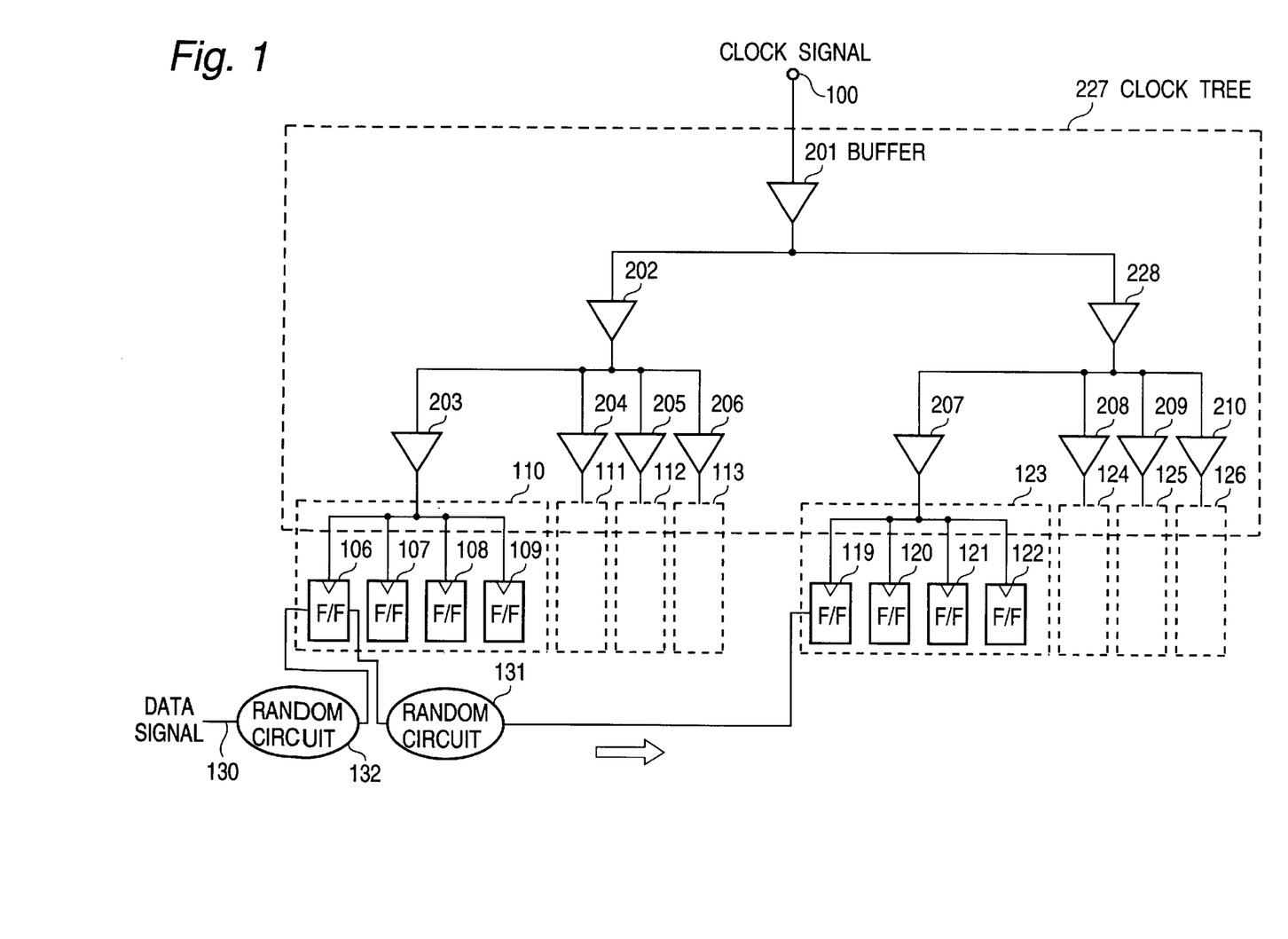
FIG. 1 is a block diagram of one embodiment of the clock signal supplying integrated circuit in accordance with the present invention for supplying in-phase clock signals to function blocks driven with different power supply voltages.

Referring to FIG. 1, there is shown a block diagram of one embodiment of the clock signal supplying integrated circuit in accordance with the present invention for supplying in-phase clock signals to function blocks driven with different power supply voltages. In FIG. 1, elements similar to those shown in FIG. 3 are given the same Reference Numerals. The embodiment shown in FIG. 1 has two kinds of power supplies including a 3.3V power supply and a 2.5V power supply, similarly to the prior art example shown in FIG. 3, and is different from the prior art example shown in FIG. 3, in the clock tree part.

In FIG. 1, the clock input terminal 100 is connected directly to a clock tree 227, which is connected to flipflop groups 110 to 113 driven with the 3.3V power supply voltage and flipflop groups 123 to 126 driven with the 2.5V power supply voltage.

First, the construction of the clock tree 227 will be described in detail. The clock tree 227 is composed of 3.3V-operating buffers 201 to 210 and 228 (driven with the 3.3V power supply voltage) connected in a tree structure having three cascaded stages. Therefore, the clock tree 227 is constituted of only the circuits operating with the 3.3V power supply voltage. An input of a first stage 3.3V-operating buffer 201 is connected to the clock input terminal 100, and respective inputs of second stage 3.3V-operating buffers 202 and 228 are connected in common to an output of the first stage 3.3V-operating buffer 201. Respective inputs of third stage 3.3V-operating buffers 203 to 206 in a first group are connected in common to an output of the second stage 3.3V-operating buffer 202, and respective inputs of third stage 3.3V-operating buffers 207 to 210 in a second group are connected in common to an output of the second stage 3.3V-operating buffer 228.

An output of the third stage 3.3V-operating buffers 203 to 210 are connected to flipflops operating with the 3.3V power supply voltage and flipflops operating with the 2.5V power supply voltage. These flipflops are divided into the 3.3V-operating flipflop groups 110 to 113 and the 2.5V-operating flipflop groups 123 to 126, each group including the same number of flipflops. Here, it is not necessarily required to group the flipflops in units of the flipflops operating with the same power supply voltage. In this embodiment, however, the flipflops are divided into groups consisting of only flipflops operating with the 3.3V power supply voltage and groups consisting of only flipflops operating with the 2.5V power supply voltage, similarly to the prior art example, and the flipflops are connected to one third stage 3.3V-operating buffer, in units of one group.

The 3.3V-operating flipflop group 110 includes 3.3V-operating flipflops 106 to 109, a clock input of each of which is connected to the output of the third stage 3.3V-operating buffer 203. The 2.5V-operating flipflop group 123 includes 2.5V-operating flipflops 119 to 122, a clock input of each of which is connected to the output of the third stage 3.3V-operating buffer 207. Similarly, a clock input of a plurality of flipflops included in the 3.3V-operating flipflop groups 111 to 113 and the 2.5V-operating flipflop groups 124 to 126 are connected to an output of the 3.3V-operating buffers 204 to 206 and 208 to 210, respectively.

Figure 2:
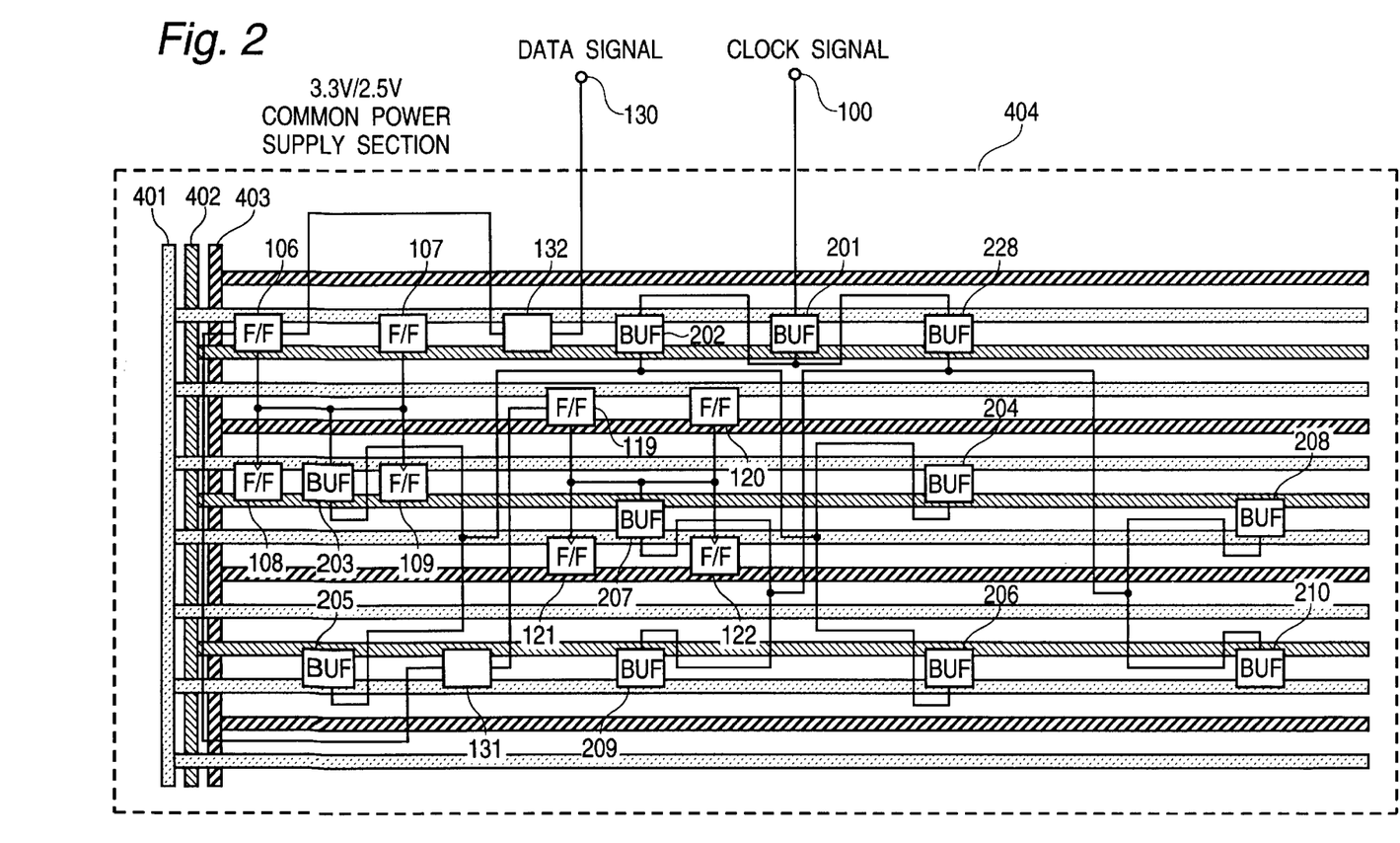
FIG. 2 is a layout diagram of one example of the layout of the clock signal supplying integrated circuit shown in FIG. 1.

Next, the method for constructing the above mentioned clock signal supplying integrated circuit (the method for laying out the constituents of the clock tree) will be described with reference to FIG. 2, which is a layout diagram of one example of the layout of the clock signal supplying integrated circuit shown in FIG. 1. In FIG. 2, elements similar to those shown in FIG. 1 and FIG. 4 are given the same Reference Numerals.

In FIG. 2, in a 3.3V/2.5V common power supply voltage section 404 there are located a ground interconnection (wiring conductor) 401, a 3.3V power supply voltage interconnection (wiring conductor) 402, a 2.5V power supply voltage interconnection (wiring conductor) 403, the 3.3V-operating flipflops 106 to 109, the 2.5V-operating flipflops 119 to 122, the random circuits 131 and 132 each located between flipflops, and the 3.3V-operating clock tree 227.

Now, the ground interconnection 401, the 3.3V power supply voltage interconnection 402 and the 2.5V power supply voltage interconnection 403 will be described in detail.

The 3.3V power supply voltage interconnection 402 and the 2.5V power supply voltage interconnection 403 are laid out in a periphery of the 3.3V/2.5V common power supply voltage section 404 and to extend in a plurality of horizontal directions within the 3.3V/2.5V common power supply voltage section 404, with the 3.3V power supply voltage interconnection 402 and the 2.5V power supply voltage interconnection 403 being separated from each other by a constant spacing. The ground interconnection 401 is laid out in a periphery of the 3.3V/2.5V common power supply voltage section 404 and to extend in a plurality of horizontal directions in the 3.3V/2.5V common power supply voltage section 404, in such a manner that the ground interconnection 401 and the 3.3V power supply voltage interconnection 402 are paired but separated from each other by a constant spacing and the ground interconnection 401 and the 2.5V power supply voltage interconnection 403 are paired but separated from each other by a constant spacing.

Next, the clock tree 227 and the flipflops in the 3.3V/2.5V common power supply voltage section 404 will be described. Each of the 3.3V-operating flipflops 106 to 109 connected to the clock tree 227 as shown in FIG. 1, is located between the ground interconnection 401 and the 3.3V power supply voltage interconnection 402, as shown in FIG. 2. The 3.3V-operating buffer 203 in the clock tree 227 is also located between the ground interconnection 401 and the 3.3V power supply voltage interconnection 402. The clock input of each of the 3.3V-operating flipflops 106 to 109 is connected to the output of the 3.3V-operating buffer 203.

The 3.3V-operating buffer 202 in the clock tree 227 is also located between the ground interconnection 401 and the 3.3V power supply voltage interconnection 402, and the input of each of the 3.3V-operating buffers 203 to 206 is connected to the output of the 3.3V-operating buffer 202. The 3.3V-operating buffer 201 in the clock tree 227 is also located between the ground interconnection 401 and the 3.3V power supply voltage interconnection 402, and the input of each of the 3.3V-operating buffers 202 and 228 is connected to the output of the 3.3V-operating buffer 201.

The clock input terminal 100 is connected to the input of the 3.3V-operating buffer 201. Each of the 2.5V-operating flipflops 119 to 122 is located between the ground interconnection 401 and the 2.5V power supply voltage interconnection 403. The 3.3V-operating buffer 207 is also located between the ground interconnection 401 and the 3.3V power supply voltage interconnection 402. The clock input of each of the 2.5V-operating flipflops 119 to 122 is connected to the output of the 2.5V-operating buffer 207.

The 3.3V-operating buffer 228 in the clock tree 227 is also located between the ground interconnection 401 and the 3.3V power supply voltage interconnection 402, and the input of each of the 3.3V-operating buffers 207 to 210 is connected to the output of the 3.3V-operating buffer 228.

Although not shown in FIG. 2, the output of the 3.3V-operating buffers 204 to 206 and 208 to 210 are connected to the flipflops in the 3.3V-operating flipflop groups 111 to 113 and the flipflops in the 2.5V-operating flipflop groups 124 to 126, respectively.

In the circuit shown in FIG. 1, the clock signal to be supplied to the 3.3V-operating flipflop 106 driven with the 3.3V power supply voltage, is supplied through the 3.3V-operating buffers 201 to 203 to the clock input of the 3.3V-operating flipflop 106. In this case, the transfer time of the clock signal from the clock input terminal 100 to the 3.3V-operating flipflop 106 is the total time of an interconnection delay time from the clock input terminal 100 to the input of the 3.3V-operating buffer 201, a gate delay time of the 3.3V-operating buffer 201, an interconnection delay time from the 3.3V-operating buffer 201 to the input of the 3.3V-operating buffer 202, a gate delay time of the 3.3V-operating buffer 202, an interconnection delay time from the 3.3V-operating buffer 202 to the input of the 3.3V-operating buffer 203, a gate delay time of the 3.3V-operating buffer 203, and an interconnection delay time from the 3.3V-operating buffer 203 to the clock input of the 3.3V-operating flipflop 106.

On the other hand, the clock signal to be supplied to the 2.5V-operating flipflop 119 driven with the 2.5V power supply voltage, is supplied through the 3.3V-operating buffers 201, 228 and 207 to the clock input of the 2.5V-operating flipflop 119. In this case, the transfer time of the clock signal from the clock input terminal 100 to the 2.5V-operating flipflop 119 is the total time of the interconnection delay time from the clock input terminal 100 to the input of the 3.3V-operating buffer 201, the gate delay time of the 3.3V-operating buffer 201, an interconnection delay time from the 3.3V-operating buffer 201 to the input of the 3.3V-operating buffer 228, a gate delay time of the 3.3V-operating buffer 228, an interconnection delay time from the 3.3V-operating buffer 228 to the input of the 3.3V-operating buffer 207, a gate delay time of the 3.3V-operating buffer 207, and an interconnection delay time from the 3.3V-operating buffer 207 to the clock input of the 2.5V-operating flipflop 119.

Here, in order to make the transfer time of the clock signal from the clock input terminal 100 to the clock input of the 3.3V-operating flipflop 106, equal to the transfer time of the clock signal from the clock input terminal 100 to the clock input of the 2.5V-operating flipflop 119, first, the interconnection delay time from the output of the 3.3V-operating buffer 201 to the input of the 3.3V-operating buffer 202, is made equal to the interconnection delay time from the output of the 3.3V-operating buffer 201 to the input of the 3.3V-operating buffer 228.

Secondly, the gate delay time of the 3.3V-operating buffer 202 is made equal to the gate delay time of the 3.3V-operating buffer 228. Thirdly, the interconnection delay time from the output of the 3.3V-operating buffer 202 to the input of the 3.3V-operating buffer 203 is made equal to the interconnection delay time from the output of the 3.3V-operating buffer 228 to the input of the 3.3V-operating buffer 207. Fourthly, the gate delay time of the 3.3V-operating buffer 203 is made equal to the gate delay time of the 3.3V-operating buffer 207. Fifthly, the interconnection delay time from the 3.3V-operating buffer 203 to the clock input of the 3.3V-operating flipflop 106 is made equal to the interconnection delay time from the 3.3V-operating buffer 207 to the clock input of the 2.5V-operating flipflop 119.

As mentioned above, in order to construct the clock tree, similarly to the prior art, the gate length and the gate width of transistors in the same stage level buffers in the clock tree structure are made equal to one another, and the wiring capacitance of the same stage level interconnections in the clock tree structure are also made equal to one another. As a result, the clock signals are actually supplied, at the same timing, to the clock input of all the flipflops included in the flipflop groups 110 to 113 and 123 to 126 connected to the clock tree 227.

In this embodiment, since the clock tree 227 is constituted of the 3.3V-operating circuits, the clock signals having the amplitude of 3.3V are applied to the 2.5V-operating flipflop groups 123 to 126. However, this is actually no problem.

Figure 6:
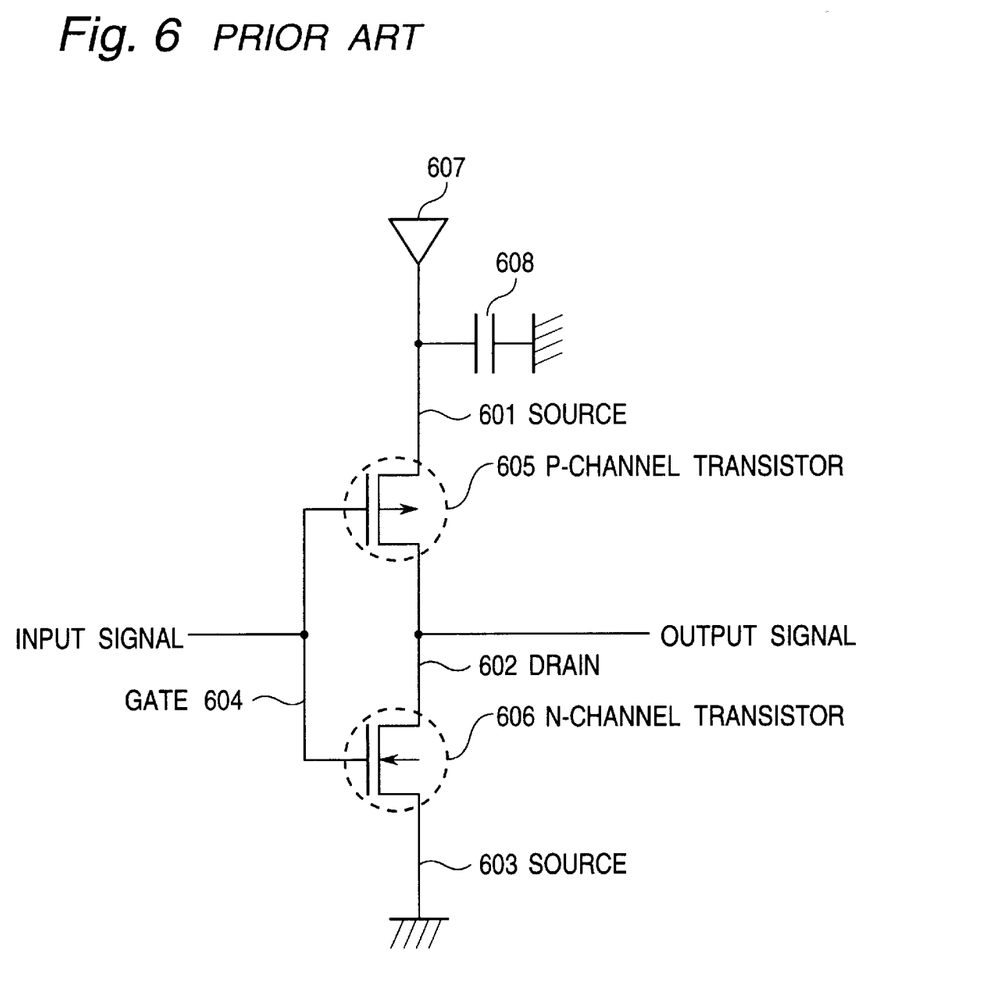
FIG. 6 is a circuit diagram of a typical input stage of the flipflop.

The reason for this will be described here. Considering that the 2.5V-operating flipflop has a CMOS inverter input stage as shown in FIG. 6, which is composed of a P-channel transistor 605 and an N-channel transistor 606 having common-connected gates 604 and common-connected drains 602, the clock signal having the amplitude of 3.3V is applied to the common-connected gates 604 of the P-channel transistor 605 and the N-channel transistor 606. The 2.5V power supply voltage is applied to a power supply voltage terminal 607 connected to a source 601 of the P-channel transistor 605. A source 603 of the N-channel transistor 606 is connected to ground.

In general, since the source 601 of the P-channel transistor 605 is ordinarily associated with a load capacitance 608, when 0 V is applied to the gate 604 of the P-channel transistor 605, the potential of the source 601 of the P-channel transistor 605 drops, and the P-channel transistor 605 is turned on. Therefore, a time is required until the current starts to flow from the source 601 to the drain 602 of the P-channel transistor 605. On the other hand, the N-channel transistor 606 is turned off. Thus, the voltage of 2.5V is outputted from the drain 602 of the P-channel transistor 605. In this process, since 0V is applied to the gate 604 of the P-channel transistor 605, the transition speed does not substantially depend upon which of the clock signal having the amplitude of 3.3V and the clock signals having the amplitude of 2.5V is applied to the gates 604 of the P-channel transistor 605 and the N-channel transistor 606.

On the other hand, when the voltage of 3.3V is applied to the gate 604, since the P-channel transistor 605 and the N-channel transistor 606 included in the 2.5V-operating flipflop have a threshold absolute value sufficiently larger than 0V and sufficiently smaller than 2.5V, the P-channel transistor 605 is turned off and the N-channel transistor 606 is turned off. Rather, when the voltage of 3.3V is applied to the gate 604, the turning-on of the N-channel transistor 606 and the turning-off of the P-channel transistor 605 become slightly quick in comparison with the case that the voltage of 2.5V is applied to the gate 604. However, this slight quickness of the turning-on and the turning-off will give no adverse influence.

In addition, since the LSI including the 2.5V-operating function blocks and the 3.3V-operating function blocks in a mixed condition is designed to have a breakdown voltage of larger than 3.3V, even if 3.3V is applied to the gate of the transistors included in the 2.5V-operating flipflop, no breakdown occurs.

Therefore, there occurs no problem in an actual operation of the flipflop.

Now, a method for constructing the above mentioned clock signal supplying integrated circuit will be described with reference to FIG. 2.

First, the section 404 for locating 3.3V layout cells and 2.5 V layout cells therein are determined. Then, the ground interconnection 401, the 3.3V power supply voltage interconnection 402 and the 2.5V power supply voltage interconnection 403 are laid out in the 3.3V/2.5V common power supply section 404, as shown in FIG. 2. Furthermore, in the 3.3V/2.5V common power supply section 404, the 3.3V layout cells other than the clock tree are located between the ground interconnection 401 and the 3.3V power supply voltage interconnection 402, and the 2.5V layout cells are located between the ground interconnection 401 and the 2.5V power supply voltage interconnection 403.

Thereafter, the clock tree in the 3.3V/2.5V common power supply section 404 is laid out and connected. Here, since the flipflops connected to the 3.3V-operating buffers 202 to 206 have the same construction, and since the flipflops connected to the 3.3V-operating buffers 207 to 210 have the same construction, the 3.3V-operating buffers 203 and 207 will be described as a representative in the following:

First, the third stage 3.3V-operating buffer 203 is located between the ground interconnection 401 and the 3.3V power supply voltage interconnection 402 at a position near to the 3.3V-operating flipflops 106 to 109. Then, the output of the 3.3V-operating buffer 203 is connected to the respective clock inputs of the 3.3V-operating flipflops 106 to 109, by using a detouring wiring if necessary, in such a manner that the wiring capacitances become equal to one another.

Thereafter, the second stage 3.3V-operating buffer 202 is located between the ground interconnection 401 and the 3.3V power supply voltage interconnection 402. Then, the output of the 3.3V-operating buffer 202 is connected to the respective inputs of the third stage 3.3V-operating buffers 203 to 206, by using a detouring wiring if necessary, in such a manner that the wiring capacitances become equal to one another.

Furthermore, the third stage 3.3V-operating buffer 207 is located between the 3.3V power supply voltage interconnection 402 at a center position among the 2.5V-operating flipflops 119 to 122, and an adjacent ground interconnection 401. The output of the 3.3V-operating buffer 207 is connected to the respective clock inputs of the 2.5V-operating flipflops 119 to 122, by using a detouring wiring if necessary, in such a manner that the wiring capacitances become equal to one another.

Thereafter, the second stage 3.3V-operating buffer 228 is located between the ground interconnection 401 and the 3.3V power supply voltage interconnection 402. Then, the output of the 3.3V-operating buffer 228 is connected to the respective inputs of the 3.3V-operating buffers 207 to 210, by using a detouring wiring if necessary, in such a manner that the wiring capacitances become equal to one another.

Furthermore, the first stage 3.3V-operating buffer 201 is located between the ground interconnection 401 and the 3.3V power supply voltage interconnection 402. Then, the output of the 3.3V-operating buffer 201 is connected to the respective inputs of the 3.3V-operating buffers 202 and 228 in such a manner that the wiring capacitances become equal to one another.

The above is a method for laying out and connecting the clock tree in the 3.3V/2.5V common power supply section 404. Finally, the clock input terminal 100 is connected to the input of the 3.3V-operating buffer 201.

In the embodiment shown in FIG. 1, the flipflops 106 to 109 connected to the 3.3V-operating buffer 203 are the 3.3V-operating flipflops, and the flipflops 119 to 122 connected to the 3.3V-operating buffer 207 are the 2.5V-operating flipflops. As such, the flipflops connected to the third stage buffers in the clock tree are divided into groups each consisting of only flipflops operating with the same power supply voltage.

As a modification, the flipflops connected to the third stage buffers in the clock tree are divided into groups each consisting of only flipflops positioned near to each other, independently of the power supply voltage. In this case, each group may include flipflops operating with different power supply voltages. For example, in the layout shown in FIG. 2, the 3.3V-operating flipflops 107 and 109 and the 2.5V-operating flipflops 119 and 121 are grouped as one group, and connected to the output of the 3.3V-operating buffer 203. In this modification, the length of the interconnection between the buffers in the clock tree can be shortened, and therefore, it becomes easy to adjust the delay time at the constructing the clock tree.

In the prior art, the clock tree for the function block operating with the 2.5V power supply voltage is constituted of the 2.5V-operating buffers. In this embodiment, however, the clock tree portion for the function block operating with the 2.5V power supply voltage is constituted of the 3.3V-operating buffers. Therefore, the consumed electric power is increased in comparison with the prior art, but since the consumed electric power of only the buffers included in the clock tree is increased, the increase of the consumed electric power is substantially negligible.

As seen from the above, the present invention is characterized in that the clock signal is distributed to the plurality of memory means driven with different power supply voltages, through the intermediary of the plurality of buffers connected in the form of the clock tree having at least two cascaded stages and all driven with the common power supply voltage, even if the diffusion condition of the LSI manufacturing process and/or the operating temperature of the LSI vary, and therefore, even if the propagation time in the LSI, specifically, in the clock tree, also varies, the respective propagation times of the output clock signals actually applied to the plurality of memory means driven with different power supply voltages, are the same as each other, and therefore, the output clock signals actually applied to the plurality of memory means driven with different power supply voltages, respectively, are the same in phase. Accordingly, it is possible to transfer data between memory means driven with different power supply voltages.

In addition, since no delay circuit is included for adjusting the propagation time, it is possible to shorten the designing time for the layout of the clock tree.

The invention has thus been shown and described with reference to the specific embodiments. However, it should be noted that the present invention is in no way limited to the details of the illustrated structures but changes and modifications may be made within the scope of the appended claims.

What is claimed is:

1. A clock signal supplying integrated circuit including a plurality of buffers connected in the form of a clock tree having at least two cascaded stages, for distributing clock signals to a plurality of memory means driven with different power supply voltages, wherein said plurality of buffers connected in the form of the clock tree are driven with the highest power supply voltage of said different power supply voltages, so that the clock signal is propagated in the clock tree with substantially the same delay time, an input clock signal being applied to a first stage buffer of said plurality of buffers connected in the form of the clock tree, and a plurality of output clock signals having substantially the same phase being supplied from final stage buffers of said plurality of buffers connected in the form of the clock tree to said plurality of memory means driven with said different power supply voltages, respectively.

2. A clock signal supplying integrated circuit claimed in claim 1 wherein each of said plurality of memory means is a flipflop, and said final stage buffers of said plurality of buffers are a plurality of buffers located in parallel, each of which is connected to a plurality of flipflops.

3. A clock signal supplying integrated circuit claimed in claim 2 wherein each of said final stage buffers is connected to the same number of flipflops.

4. A clock signal supplying integrated circuit claimed in claim 1 wherein said plurality of memory means driven with said different power supply voltages include a plurality of 3.3V-operating flipflops and a plurality of 2.5V-operating flipflops, and said plurality of buffers connected in the form of said clock tree are composed of only a plurality of 3.3V-operating buffers connected in the form of a clock tree having at least two cascaded stages.

5. A clock signal supplying integrated circuit claimed in claim 4 wherein each of said plurality of 2.5V-operating flipflops includes a CMOS inverter input stage receiving a clock signal having the amplitude of 3.3V from a last stage buffer of said plurality of 3.3V-operating buffers connected in the form of said clock tree.

6. A clock signal supplying integrated circuit claimed in claim 4 wherein said plurality of 3.3V-operating buffers are connected in the form of a clock tree having three cascaded stages.

7. A method for constructing a clock signal supplying integrated circuit which includes a plurality of buffers connected in the form of a clock tree having at least two cascaded stages to distribute clock signals to a plurality of memory means driven with different power supply voltages, the method including the steps of laying out a ground interconnection and a plurality of power supply voltage interconnections for different power supply voltages in one location section, locating each of said memory means driven with said different power supply voltages, between said ground interconnection and the power supply voltage interconnection of a corresponding power supply voltage, locating each of a plurality of buffers between said ground interconnection and the power supply voltage interconnection for the highest power supply voltage of said power supply voltage interconnections and connecting said plurality of buffers to constitute a clock tree having at least two cascaded stages, connecting an input of a first stage buffer of the clock tree to a clock input terminal, and connecting an output of final stage buffers of the clock tree to a clock input of said plurality of memory means driven with said different power supply voltages.

8. A method for constructing the clock signal supplying integrated circuit, claimed in claim 7 wherein each of said plurality of memory means is a flipflop, and said final stage buffers of said plurality of buffers are a plurality of buffers located in parallel, each of which is connected to a plurality of flipflops.

9. A method for constructing the clock signal supplying integrated circuit, claimed in claim 8 wherein each of said final stage buffers is connected to the same number of flipflops.

10. A method for constructing the clock signal supplying integrated circuit, claimed in claim 7 wherein said plurality of power supply voltage interconnections include a 3.3V power supply voltage interconnection and 2.5V power supply voltage interconnection, and wherein said plurality of memory means include a plurality of 3.3V-operating flipflops and a plurality of 2.5V-operating flipflops, and said plurality of buffers are composed of only a plurality of 3.3V-operating buffers, said plurality of 3.3V-operating flipflops and said plurality of 3.3V-operating buffers being located between said ground interconnection and said 3.3V power supply voltage interconnection, and said plurality of 2.5V-operating flipflops being located between said ground interconnection and said 2.5V power supply voltage interconnection.

11. A method for constructing the clock signal supplying integrated circuit, claimed in claim 10 wherein each of said plurality of 2.5V-operating flipflops includes a CMOS inverter input stage receiving a clock signal having the amplitude of 3.3V from a last stage buffer of said plurality of 3.3V-operating buffers connected in the form of said clock tree.

12. A method for constructing the clock signal supplying integrated circuit, claimed in claim 4 wherein said plurality of 3.3V-operating buffers are connected in the form of a clock tree having three cascaded stages.

* * * * *